F. T. ADAMS.
TRANSMISSION MECHANISM.
APPLICATION FILED MAR. 31, 1916. RENEWED AUG. 30, 1917.
1,242,106.
Patented Oct. 2, 1917.
2 SHEETS—SHEET 1.
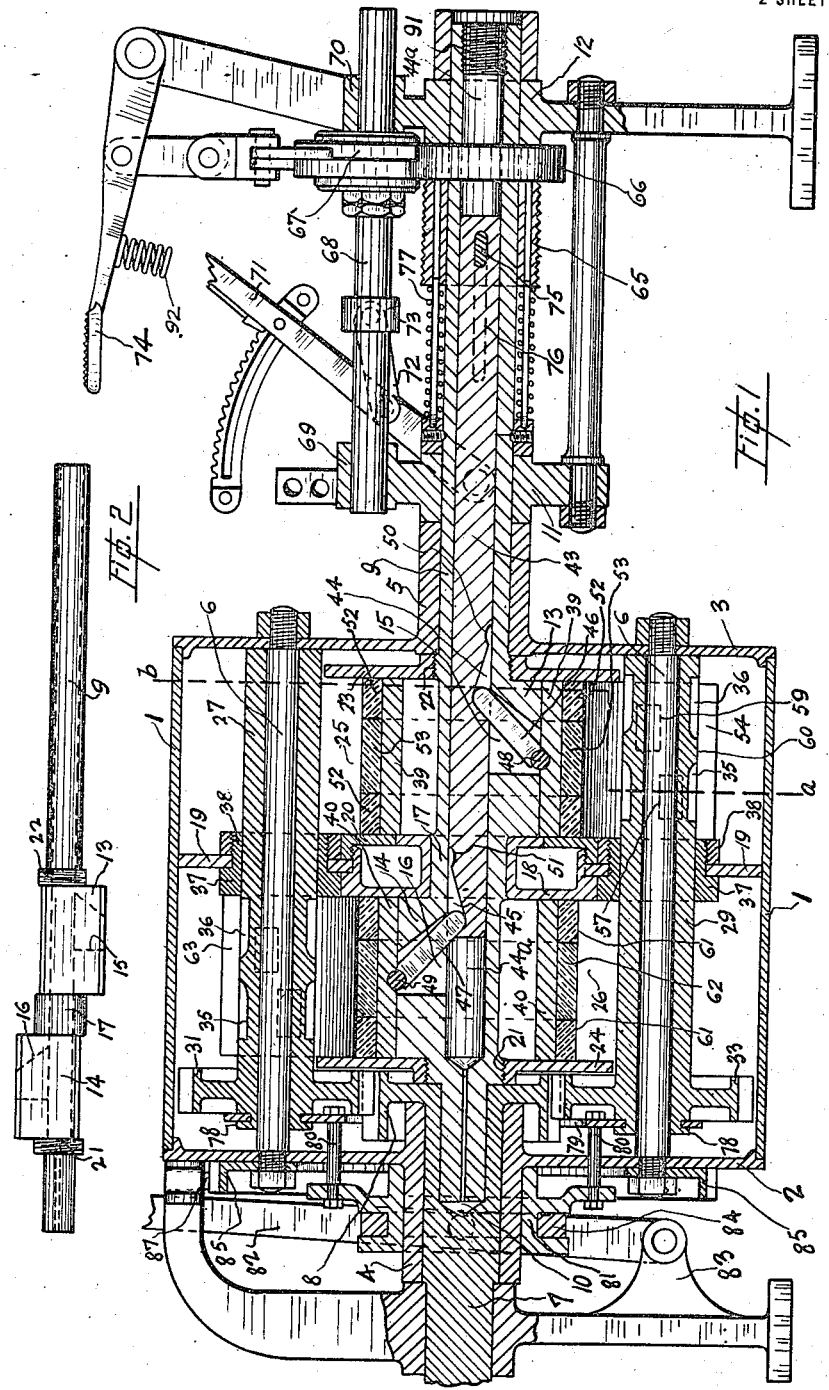
INVENTOR.
FREDERICK THOMAS ADAMS.
BY Featherstonhaugh Co.
ATTY'S.

F. T. ADAMS.
TRANSMISSION MECHANISM.
APPLICATION FILED MAR. 31, 1916. RENEWED AUG. 30, 1917.
1,242,106.
Patented Oct. 2, 1917.
2 SHEETS—SHEET 2.
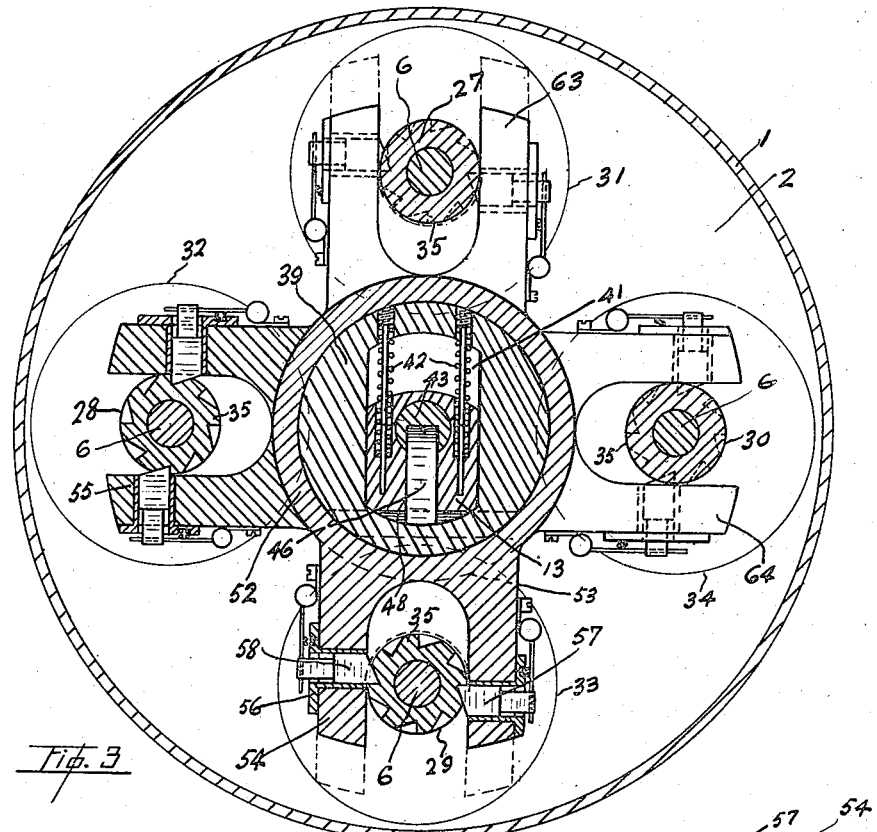
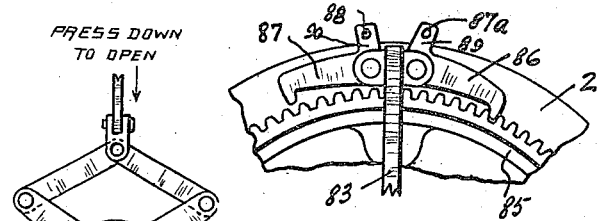
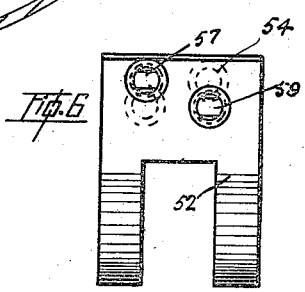
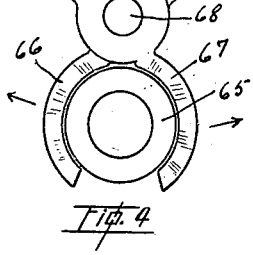
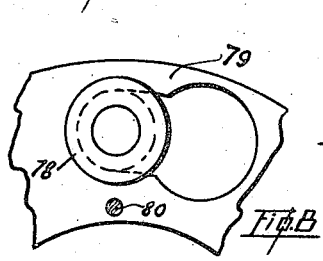
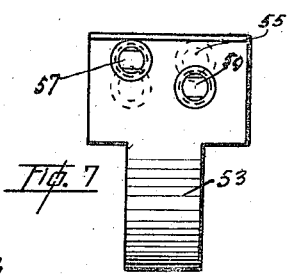
INVENTOR.
FREDERICK THOMAS ADAMS.

UNITED STATES PATENT OFFICE.

FREDERICK THOMAS ADAMS, OF VANCOUVER, BRITISH COLUMBIA, CANADA.

TRANSMISSION MECHANISM.

1,242,106.     Specification of Letters Patent.     Patented Oct. 2, 1917.

Application filed March 31, 1916, Serial No. 88,019. Renewed August 30, 1917. Serial No. 189,042.

*To all whom it may concern:*

Be it known that I, FREDERICK THOMAS ADAMS, a subject of the King of Great Britain, and a resident of the city of Vancouver, in the Province of British Columbia, Canada, have invented certain new and useful Improvements in Transmission Mechanism, of which the following is a specification.

My invention relates to improvements in transmission mechanism, and the object of my invention is to devise an efficient mechanism for transmitting motion from one shaft to another, such as in the drive of an automobile, which mechanism is smooth and flexible in operation, working without jar, is adapted to act as a clutch and transmission gear combined, and is capable of driving the driven shaft at variable speeds at the will of the operator without varying the normal speed of the driving shaft. A further object is to devise a transmission mechanism by means of which the driven shaft may be rotated in either direction in a simple practical manner.

I attain these objects by the construction illustrated in the accompanying drawings in which—

Figure 1 is a side elevation of the device, in cross section.

Fig. 2 is a view of the eccentric shaft.

Fig. 3 is a transverse section of the device on the line *a—b* of Fig. 1.

Fig. 4 is a face view of the starting jaws.

Fig. 5 is a fragmentary view showing the means for holding the gear case stationary.

Fig. 6 is a detail view of a double eccentric strap.

Fig. 7 is a detail view of a single eccentric strap.

Fig. 8 is a view showing a portion of the reversing ring.

Similar figures of reference indicate similar parts throughout the several views.

1 indicates a casing having end flanges 2 and 3 provided with concentric bores forming bearings 4 and 5, and held together by four studs 6. Mounted in bearing 4 is the driven shaft 7, to the inner end of which is secured the gear 8, while mounted in bearing 5 is a hollow shaft 9, the inner extremity of which is reduced to fit rotatably in a bore 10 provided in the inner end of shaft 7, as shown, its outer extremity being internally threaded as at 91 to receive the main shaft (not shown). This hollow shaft 9 extends outwardly through bearing 5 and is rotatably supported in the bearings 11 and 12, and formed integrally on the shaft at suitable points and diametrically opposite to each other are offset portions forming, as it were, eccentrics 13 and 14, in which eccentrics are formed the slots 15 and 16, as shown in Fig. 1. A concentric plain portion 17 is provided between the eccentrics and which runs in a bearing 18 carried by the plate member 19, the rim of the bearing 18 being threaded so that it may be rigidly secured to the plate 19 by means of the nut 20. Formed on shaft 9 at the outer end of the eccentrics 13 and 14 are right and left hand externally threaded portions 21 and 22 respectively, on which are mounted the disks 23 and 24, of suitable diameter, so that it will be seen, referring particularly to Fig. 1, that guideways 25 and 26 are formed, the sides of which consist, respectively, of the face of nut 20 and disk 23 and the face of bearing 18 and disk 24.

27, 28, 29 and 30 indicate sleeves rotatably and slidably mounted on their respective studs 6, each of which sleeves is provided at one end with a gear 31, 32, 33 and 34 respectively, which gears mesh with the gear 8 of the shaft 7. On the periphery of each sleeve are formed two sets of ratchet shaped teeth 35 and 36, the teeth 35 facing in one direction, as shown in Fig. 3, while the teeth 36 face in the opposite direction. The sets of teeth are arranged in pairs, that is, sets 35 and 36 of sleeves 27 and 30 are adjacent their respective gears and in alinement with each other, while sets 35 and 36 of sleeves 28 and 29 are adjacent the ends remote from the gears, and in alinement with each other. The respective sleeves, while being rotatably mounted on the studs 6, are also rotatably carried in the bushings 37, which are carried by plate member 19, each being rigidly secured thereto by means of a nut 38.

39 and 40 indicate circular block members each provided with a longitudinal slot 41, by means of which they may be slidably mounted on the eccentrics of shaft 9, 39 being mounted on eccentric 13, as shown more particularly in Fig. 3, and 40 on eccentric 14. Normally the blocks 39 and 40 are concentric with shaft 9, but the slots 41 are made longer than the throw of the eccentrics 13 and 14, as shown in Fig. 3, so that the blocks may be moved to become eccentric to shaft 9, when required, as more fully hereinafter described, and for the purpose of assisting the return of the blocks 39 and 40 to their normal concentric positions springs 42 are provided, as shown in Fig. 3, these springs being in compression when the blocks are in the eccentric position.

In order to move the blocks 39 and 40 out of their concentric positions a rod or shaft 43 is provided, which shaft is slidably mounted for inward and outward movement in the bore 44ª of the hollow shaft 9, and at suitable points on its periphery there are formed tapering grooves 44 and 45, in which grooves are fitted levers 46 and 47 respectively, which levers pass through the slots 15 and 16 of eccentrics 13 and 14, their upper ends being shaped out to bear on bar members 48 and 49 respectively secured into blocks 39 and 40 respectively, and their lower ends being rounded to fit the rounded portions 50 and 51 at each end of the grooves 44 and 45, when the rod 43 is in "full in" or the "full out" position. It will thus be seen that, if the rod 43 be moved inwardly from its "full out" position, as shown in Fig. 1, the levers 46 and 47 will be straightened out and, when the rod is in its "full in" position, they will assume a vertical position, and therefore the blocks 39 and 40 will be carried out of their concentric positions to become eccentric to shaft 9, their travel varying according to the inclination of levers 46 and 47.

Mounted on block member 39 is a double eccentric strap 52, shown in Fig. 6, the double strap being carried at each end of the block leaving a bearing portion therebetween on which is mounted a single eccentric strap 53, as shown in Fig. 7, the assembled position of the straps being shown in Fig. 1. Each of these straps 52 and 53 carries a jaw member 54 and 55 respectively, fitting slidably the guideway 25 and straddling respectively the sleeves 29 and 28. The jaw member 54 is provided with two pairs of spring-pressed pawls slidably mounted in bushings 56, one pair, 57 and 58, being arranged as shown in Fig. 3 and adapted to engage the ratchet teeth 35 of sleeve 29, the other pair, one of which is indicated dotted in Fig. 1, as at 59, being arranged reverse from 57 and 58, and adapted to ride on the plain portion 60 between the two sets of ratchet teeth when 57 and 58 are in engagement with teeth 35 and to engage the reverse set of teeth 36 when the sleeve is slid longitudinally, as hereinafter described, the pawls 57 and 58 then being thrown out of engagement with teeth 35 to ride on the periphery of the sleeve. Similarly the jaw member 55 is provided with two pairs of spring-pressed pawls adapted to coöperate with the ratchet teeth 35 and 36 of sleeve 28.

In a like manner to that just described a double eccentric strap 61 and a single eccentric strap 62 are mounted on block 40, each strap being provided respectively with jaw members 63 and 64 straddling their respective sleeves 27 and 30, each jaw member being provided with two pairs of spring-pressed pawls similar to 57 and 58 adapted to coöperate as described with the ratchet teeth 35 and 36 of their respective sleeves 27 and 30.

65 indicates an externally threaded nut or sleeve slidably mounted on shaft 9 and 66 and 67 indicate a pair of jaws or tong-like members pivotally mounted on and movable with a shaft 68, which shaft is slidably mounted in bearings 69 and 70 and may be moved backward or forward by means of the suitable fulcrumed hand lever 71 connected to the shaft by lever 72 and fixed collar 73. The members 66 and 67 are connected by suitable levers to a foot pedal 74 and are hung so that their inner faces, which are threaded correspondingly to the nut 65, are held normally closed in front and in way of the nut by means of spring 92 but open out to clear the nut when downward pressure is exerted on the pedal. It will thus be apparent that the members 66 and 67 may be moved along the nut to grip same at any point in its length. The nut 65 is secured to the rod 43 by means of a cotter 75 which passes through the nut, the hollow shaft 9, and the rod 43 so that they all rotate together. A slot 76 indicated dotted in Fig. 1, is provided in the shaft 9 to allow for the travel of the cotter 75 as the nut 65 moves along the shaft, as more fully hereinafter described, and 77 indicates a spring for returning the nut to the normal position shown in Fig. 1.

Each sleeve gear 31, 32, 33 and 34 is provided with a collar, indicated by the numeral 78 in Fig. 1, over which collar a ring 79 is engaged, as shown in Figs. 1 and 8, and which ring is connected by means of bolts 80 passing through flange 2 to a sliding sleeve 81 mounted on bearing 4 and operated by a hand lever 82 fulcrumed on a suitable bracket or stand 83. This sleeve is connected to lever 82 by means of a band 84 in which it is rotatable, after the style of the well-known clutch shifting gear, so that the sleeve may either rotate, or slide, on the bearing 4, the sliding movement of the sleeve also moving gears 31, 32, 33 and 34 to throw the respective sets of ratchet teeth 35 and 36 into or out of engagement with their respective pawls.

In order to prevent the casing 1 from rotating until the driven shaft 7 reaches its maximum speed a circular rack member 85 is secured to flange 2 as shown in Fig. 1, with which rack coöperate pawls 86 and 87, which pawls are pivotally mounted at the upper end of bracket 83, and may be lifted out of, or dropped into, engagement with the rack 85 by any suitable manually operated means led from a suitable location and connected to holes 87ª and 88 in the arms 89 and 90 of the pawls.

The manner in which the device operates is as follows:—When it is desired to drive shaft 7, say at its maximum speed, the operator presses down on the foot pedal 74, thus opening out jaws 66 and 67, which may then be moved backward along the nut 65 by means of lever 71. When the jaws are brought to the desired position, the pressure on the foot pedal is relieved, whereupon the spring 92 forces the jaws inwardly and closes them on the threaded periphery of the nut at the rear end thereof, the threads of the jaws engaging on the threads of the nut, whereupon the nut, which is revolving with the hollow shaft 9, will screw itself backward out of the jaws 66 and 67, thus moving rod 43 inward and carrying levers 46 and 47 into a vertical position to move the blocks 39 and 40 from their concentric positions to their full eccentric positions with relation to shaft 9. Thus a travel is imparted to the jaws of the several eccentric straps, each of which, on its inward and outward movements, and by means of its spring-pressed pawls, hereinbefore described, partially rotates its respective sleeve and the gear thereon, the partial rotation of which gears, one after the other, effects the complete rotation of the gear 8 and shaft 7, which will then revolve at the same speed as the driving shaft, the entire mechanism including the casing then rotating with the shafts.

When it is desired to drive shaft 7 at a lower speed than that of the driving shaft the operator moves the jaws 66 and 67 backward along the nut and closes them thereon at the desired point in its length, whereupon the nut will screw itself out of the jaws as before. It will be seen, however, that if the jaws are closed on to the nut at say, a quarter of its length, the nut will only travel backward that amount, the rod 43 moving inward, and the levers 46 and 47 straightening out, a corresponding amount, and therefore the travel of the several eccentrics and the amount of partial rotation of the sleeve gears effected thereby will be correspondingly decreased thus reducing also the speed of shaft 7. Accordingly it will be apparent that the speed of the driven shaft 7 may be regulated, from the highest speed of the driving shaft through any lower speeds, according to the position at which the jaws 66 and 67 are closed on the nut 65. It may be mentioned that the length of the nut equals the full throw of the eccentrics, so that at one-half the nut travel the eccentrics are working at half throw and so on.

The nut is held in its backward positions by means of the jaws 66 and 67, which are closed in front of it, the jaws being opened out, when required by any approved means, such as spring 92, to permit the return of the nut to its normal forward position, which is accomplished by means of spring 77.

The reversing of shaft 7 is accomplished by moving lever 82 to slide the sleeve 81 outwardly, thus drawing sleeves 31, 32, 33 and 34 also outwardly to bring the reversed pawls carried by the jaws of the several eccentrics into engagement with the sets of reversed ratchet teeth carried by the respective sleeves; as it will be apparent that, if one arrangement of pawls and ratchet teeth effects the rotation of shaft 7 in one direction, a reversed arrangement will effect its rotation in the opposite direction.

At lower speeds of shaft 7 than the maximum the brake pressure thereon tends to hold the shaft from being rotated by the sleeve gears, which would revolve around gear 8 if they were free to do so and carry the casing around with them, but this is prevented by means of the pawls 86 and 87, one of which is dropped into engagement with rack 85, according to the direction of rotation of the shaft, so that the casing cannot turn and thus the sleeve gears coöperate efficiently on gear 8 at lower speeds than the maximum. When the maximum speed is reached, it is not necessary to hold the casing, and the pawl is lifted out of the rack so that the casing may be free to revolve, as it is desirable that it should do so; and in order to accomplish this result, it may be stated that the eccentrics, hereinbefore described, are designed, when out to their full throw, to give a longer stroke than is allowed for in the jaw members for the effecting of the revolving of the sleeves, from which it will be apparent that, when the levers 46 and 47 are straightened out to their fullest extent, the bottom of the two opposite jaw members 54—63 or 55—64, according to whichever pair is in position at the moment, will be pressed against the periphery of their respective sleeves, thus locking the jaw members and the sleeves together, as it will be apparent that the blocks 39 and 40 cannot travel over the center when the respective levers 46 and 47 are full out, and therefore the blocks will cease to rotate, whereupon the whole mechanism, including the casing, will revolve together as a solid shaft.

What I claim as my invention is:

1. In transmission mechanism, the combination with a power shaft, and a driven shaft, of a central gear fixed to the driven shaft, a plurality of gears engaging the central gear, and mechanism adapted for engagement with the power shaft for imparting intermittent partial rotary motion to each of the said gears whereby complete rotation of the central gear is effected, said mechanism including a yoked member coacting with each of the plurality of gears.

2. In transmission mechanism, the combination with a power shaft and a driven shaft, of a central gear fixed to the driven shaft, a plurality of sleeves rotatably mounted parallel with said shafts, each said sleeve being provided with a gear engaging the central gear, and mechanism adapted for engagement with the power shaft for imparting intermittent partial rotary motion to each said sleeve whereby complete rotation of the central gear is effected, said mechanism including a yoked member coacting with each of the plurality of sleeves, and an interiorly projecting pawl carried by each leg of the yoke.

3. In transmission mechanism, the combination with a power shaft and a driven shaft, of a central gear fixed to the driven shaft, a plurality of sleeves rotatably and slidably mounted parallel with said shafts, each said sleeve being provided with an integral gear engaging the central gear, mechanism adapted for engagement with the power shaft for imparting intermittent partial rotary motion to each said sleeve whereby complete rotation of the central gear is effected, and means for reversing the direction of rotation of said sleeves.

4. In transmission mechanism, the combination with a power shaft and a driven shaft, of a central gear fixed to the driven shaft, a plurality of sleeves rotatably mounted parallel with the said shafts, each said sleeve being provided with an integral gear engaging the central gear and having on its periphery a plurality of ratchet teeth arranged circularly equidistant from each other, a shaft adapted for engagement with the power shaft and having diametrically opposed eccentric portions thereon, straps mounted concentrically on said eccentric portions, each strap having jaws adapted to straddle its respective sleeve, pawls carried by said jaws arranged inversely to each other and adapted to normally engage the ratchet teeth of their respective sleeve on opposite sides thereof, and means for imparting eccentricity to said straps.

5. In transmission mechanism, the combination with a power shaft and a driven shaft, of a central gear fixed to the driven shaft, a plurality of sleeves rotatably mounted parallel with the said shafts, each said sleeve being provided with an integral gear engaging the central gear and having on its periphery a plurality of ratchet teeth arranged circularly equi-distant from each other, a shaft adapted for engagement with the power shaft and having diametrically opposed eccentric portions formed thereon, a strap for each sleeve mounted concentrically on the said eccentric portions, each said strap having jaws adapted to straddle its respective sleeve, pawls carried by said jaws arranged inversely to each other and adapted to normally engage the ratchet teeth of their respective sleeve on opposite sides thereof, means for imparting eccentricity to said straps, and means for predetermining and varying the amount of eccentricity imparted.

6. In transmission mechanism, the combination with a power shaft and a driven shaft, of a central gear fixed to the driven shaft, a plurality of sleeves rotatably mounted parallel with said shafts, each said sleeve being provided with an integral gear engaging the central gear and having on its periphery a plurality of ratchet teeth arranged circularly equi-distant from each other, a shaft adapted for engagement with the power shaft and having diametrically opposed eccentric portions formed thereon, a block for each pair of sleeves mounted concentrically on each eccentric portion, a strap for each sleeve, said straps being mounted in pairs on each said block, each said strap having jaws adapted to straddle its respective sleeve, pawls carried by said jaws arranged inversely to each other and adapted to normally engage the ratchet teeth of their respective sleeve on opposite sides thereof, and means for imparting variable amounts of eccentricity to the said blocks.

7. In transmission mechanism, the combination with a power shaft and a driven shaft, of a central gear fixed to the driven shaft, a plurality of sleeves rotatably mounted parallel with said shafts, each said sleeve being provided with an integral gear engaging the central gear and having on its periphery a plurality of ratchet teeth arranged circularly equi-distant from each other, a hollow shaft adapted for engagement with the power shaft and having diametrically opposed slotted eccentric portions formed thereon, a block member for each pair of sleeves mounted concentrically on the said eccentric portions, a strap for each sleeve, said straps being mounted in pairs on each said block member, each said strap having jaws adapted to straddle its respective sleeve, pawls carried by said jaws arranged inversely to each other and normally engaging the ratchet teeth of their respective sleeve on opposite sides thereof, a rod mounted for inward and outward movement in the bore of the hollow shaft and provided with tapering slots equal in number to the block members formed in the body thereof, a lever for each block member, each said lever extending at an angle between its respective tapering slot in the rod and the block member its lower end normally resting in the deep portion of the slot, and means for moving the said rod inwardly so as to straighten out said levers and impart eccentricity to the said block members.

8. In transmission mechanism, the combination with a power shaft and a driven shaft, of a central gear fixed to the driven shaft, a plurality of sleeves rotatably mounted parallel with said shafts, each said sleeve being provided with an integral gear engaging the central gear and having on its periphery a plurality of ratchet teeth arranged circularly equi-distant from each other, a hollow shaft adapted for engagement with the power shaft and having diametrically opposed slotted eccentric portions formed thereon, a block member for each pair of sleeves mounted concentrically on the said eccentric portions, a strap for each sleeve, said straps being mounted in pairs on each said block member, each said strap having jaws adapted to straddle its respective sleeve, pawls carried by said jaws arranged inversely to each other and normally engaging the ratchet teeth of their respective sleeve on opposite sides thereof, a rod mounted for inward and outward movement in the bore of the hollow shaft, and provided with tapering slots equal in number to the block members formed in the body thereof, a lever for each block member, each said lever extending at an angle between its respective tapering slot in the rod and the block member its lower end normally resting in the deep portion of the slot, an externally threaded nut mounted for slidable movement on the hollow shaft and engaged thereto and to the said rod to simultaneously rotate therewith, and manually operated internally threaded gripping means adapted to grip the nut at any point in its length, the threads of the nut and gripping means being designed so that the nut will unscrew out of the gripping means when engaged thereby.

9. In transmission mechanism, the combination with a power shaft and a driven shaft, of a central gear fixed to the driven shaft, a plurality of sleeves rotatably and slidably mounted parallel with said shafts, each said sleeve being provided with an integral gear engaging the central gear and having on its periphery two sets of ratchet teeth arranged circularly, one set being reverse to the other, a shaft adapted for engagement with the power shaft and having diametrically opposed eccentric portions formed thereon, straps equal in number to the sleeves mounted concentrically on said eccentric portions, each strap having jaws adapted to straddle its respective sleeve, a pair of pawls for each set of teeth carried by said jaws, the pawls in each pair being arranged inversely to each other and adapted to engage the sleeve on opposite sides thereof, one pair being reverse to the other and adapted to coöperate with the reverse set of teeth, means for moving either set of teeth into or out of engagement with its respective pair of pawls, and means for imparting eccentricity to said straps.

10. In transmission mechanism, the combination with a power shaft and a driven shaft, of a casing into which the driven shaft extends, a central gear fixed to the driven shaft, a plurality of gears carried by said casing engaging the central gear, mechanism adapted for engagement with the power shaft for imparting intermittent partial rotary motion to each said gear whereby complete rotation of the central gear is effected, and releasable means for locking the casing against rotation.

11. In transmission mechanism, the combination with a power shaft and a driven shaft, of a casing into which the driven shaft extends, a central gear fixed to the driven shaft, a plurality of gears carried by said casing engaging the central gear, mechanism adapted for engagement with the power shaft for imparting intermittent partial rotary motion to each said gear whereby complete rotation of the central gear is effected, and means for holding the casing against rotation at lower speeds of the driven shaft than the maximum, said means being adapted to permit rotation of said casing when the maximum speed of the driven shaft is reached.

12. In transmission mechanism, the combination with a power shaft and a driven shaft, of a central gear fixed to the driven shaft, a plurality of gears engaging the central gear, and mechanism adapted for engagement with the power shaft for imparting intermittent partial rotary motion to each of the said gears at lower speeds than the maximum, said mechanism being adapted to lock said gears and prevent the said intermittent partial rotary motion thereof at the maximum speed.

13. In a transmission mechanism, the combination with the power shaft and driven shaft, of transmission gears interposed between the power shaft and driven shaft, means adjustable radially for transmitting the drive from the power shaft to the gears to vary the speed, means adjustable axially of the power shaft for producing such radial adjustment, an externally threaded rotating member connected to the axially adjustable means, a correspondingly threaded swinging and relatively stationary member, and means for throwing the thread of the swinging member into contact with the thread of the externally threaded member.

14. In a transmission mechanism, the combination with the power shaft and driven shaft, of transmission gears interposed between the power shaft and driven shaft, means adjustable radially for transmitting the drive from the power shaft to the gears to vary the speed, means adjustable axially of the power shaft for producing such radial adjustment, an externally threaded rotating member connected to the axially adjustable means, a correspondingly threaded swinging and relatively stationary member, means for throwing the thread of the swinging member into contact with the thread of the externally threaded member, and means for adjusting the stationary position of the swinging member longitudinally of the externally threaded member.

Dated at Vancouver, B. C., this 21st day of March, 1916.

FREDERICK THOMAS ADAMS.

Copies of this patent may be obtained for five cents each, by addressing the "Commissioner of Patents, Washington, D. C."